(12) United States Patent
Liu et al.

(10) Patent No.: US 9,589,582 B2
(45) Date of Patent: Mar. 7, 2017

(54) HIGH MOMENT SIDE SHIELD DESIGN FOR AREA DENSITY IMPROVEMENT OF PERPENDICULAR MAGNETIC RECORDING (PMR) WRITER

(71) Applicants: Headway Technologies, Inc., Milpitas, CA (US); TDK Corporation, Tokyo (JP)

(72) Inventors: Yue Liu, Fremont, CA (US); Atsushi Yamaguchi, Tokyo (JP); Yuhui Tang, Milpitas, CA (US); Jiun-Ting Lee, Sunnyvale, CA (US); Yaguang Wei, Pleasanton, CA (US); Xiaomin Liu, Fremont, CA (US); Hideyuki Ukita, Tokyo (JP); Moris Dovek, San Jose, CA (US); Michitaka Nishiyama, Tokyo (JP)

(73) Assignees: Headway Technologies, Inc., Milpitas, CA (US); TDK Corporation, Tokyo (JP)

( * ) Notice: Subject to any disclaimer, the term of this patent is extended or adjusted under 35 U.S.C. 154(b) by 0 days.

(21) Appl. No.: 15/162,091

(22) Filed: May 23, 2016

(65) Prior Publication Data
US 2016/0307586 A1 Oct. 20, 2016

Related U.S. Application Data

(62) Division of application No. 14/690,693, filed on Apr. 20, 2015, now Pat. No. 9,361,912.

(51) Int. Cl.
*G11B 5/31* (2006.01)
*G11B 5/60* (2006.01)
*G11B 5/127* (2006.01)

(52) U.S. Cl.
CPC ......... *G11B 5/3116* (2013.01); *G11B 5/1278* (2013.01); *G11B 5/6082* (2013.01)

(58) Field of Classification Search
CPC ... G11B 5/00826; G11B 5/3116; G11B 5/187; G11B 5/3912; G11B 5/11; G11B 5/1278
See application file for complete search history.

(56) References Cited

U.S. PATENT DOCUMENTS 6,912,106 B1 * 6/2005 Chen .................... G11B 5/3163
                                                                    360/123.24
6,954,340 B2 10/2005 Shukh et al.
(Continued)

OTHER PUBLICATIONS

Co-pending U.S. Pat. No. HT14-025, U.S. Appl. No. 14/819,534, filed Aug. 6, 2015, "Perpendiuclar Magnetic Recording (PMR) Write Head With Improved Shapes of Side Shield and Main Pole," by Yuhui Tang et al., 37 pgs.

*Primary Examiner* — Brian Miller
(74) *Attorney, Agent, or Firm* — Saile Ackerman LLC; Stephen B. Ackerman

(57) ABSTRACT

A PMR writer is disclosed wherein a hot seed layer (HS) made of a 19-24 kilogauss (kG) magnetic material is formed between a gap layer and a 10-16 kG magnetic layer in the side shields, and between the leading gap and a 16-19 kG magnetic layer in the leading shield to improve the track field gradient and cross-track field gradient while maintaining write-ability. The HS is from 10 to 100 nm thick and has a first side facing the write pole with a height of ≤0.15 micron, and a second side facing a main pole flared side that may extend to a full side shield height of ≤0.5 micron. The trailing shield has a second hot seed layer on the write gap and a 16-19 kG magnetic layer that contacts the 10-16 kG side shield magnetic layer thereby forming an all wrap around (AWA) shield configuration.

13 Claims, 12 Drawing Sheets

(56) References Cited

U.S. PATENT DOCUMENTS

| | | | |
|---|---|---|---|
| 6,975,486 B2* | 12/2005 | Chen | G11B 5/3116 360/125.56 |
| 7,006,327 B2* | 2/2006 | Krounbi | B82Y 10/00 360/123.41 |
| 7,522,379 B1* | 4/2009 | Krounbi | G11B 5/3133 360/125.2 |
| 7,631,417 B2* | 12/2009 | Lam | G11B 5/1278 205/119 |
| 7,869,160 B1* | 1/2011 | Pan | G11B 5/11 360/119.02 |
| 8,091,210 B1* | 1/2012 | Sasaki | G11B 5/1278 216/62 |
| 8,164,853 B2 | 4/2012 | Hirata et al. | |
| 8,218,264 B1 | 7/2012 | Sasaki et al. | |
| 8,243,560 B2 | 8/2012 | Araki et al. | |
| 8,270,110 B2 | 9/2012 | Araki et al. | |
| 8,274,759 B1 | 9/2012 | Sasaki et al. | |
| 8,289,649 B2 | 10/2012 | Sasaki et al. | |
| 8,295,008 B1 | 10/2012 | Sasaki et al. | |
| 8,300,357 B1 | 10/2012 | Sasaki et al. | |
| 8,345,381 B1 | 1/2013 | Sasaki et al. | |
| 8,345,382 B1 | 1/2013 | Sasaki et al. | |
| 8,456,778 B2* | 6/2013 | Min | G11B 5/1278 360/125.03 |
| 8,470,186 B2* | 6/2013 | Chen | G11B 5/1278 216/22 |
| 8,498,079 B1* | 7/2013 | Song | G11B 5/1278 360/125.3 |
| 8,508,886 B2* | 8/2013 | Chen | G11B 5/3116 360/125.3 |
| 8,582,241 B1* | 11/2013 | Yu | G11B 5/1278 360/125.43 |
| 8,724,259 B1* | 5/2014 | Liu | G11B 5/1278 360/125.15 |
| 8,749,919 B2 | 6/2014 | Sasaki et al. | |
| 8,810,964 B2 | 8/2014 | Gao et al. | |
| 2005/0128637 A1 | 6/2005 | Johnston et al. | |
| 2007/0177301 A1 | 8/2007 | Han et al. | |
| 2014/0063657 A1 | 3/2014 | Gao et al. | |

\* cited by examiner

HIGH MOMENT SIDE SHIELD DESIGN FOR AREA DENSITY IMPROVEMENT OF PERPENDICULAR MAGNETIC RECORDING (PMR) WRITER

This is a divisional application of U.S. Pat. No. 9,361,912, which is herein incorporated by reference in its entirety, and assigned to a common assignee.

RELATED PATENT APPLICATIONS

This application is related to the following: U.S. Pat. Nos. 8,164,853 and 8,749,919; both assigned to a common assignee and herein incorporated by reference in their entirety.

TECHNICAL FIELD

The present disclosure relates to a shield structure in a PMR write head wherein side shield height along a side adjacent to the main pole is reduced to ≤0.15 microns, and in particular to a composite side shield wherein a high moment layer made of a 19-24 kilogauss (kG) magnetic material faces the main pole and a low moment layer made of a 10-16 kilogauss (kG) material is formed on a side of the high moment layer opposite the main pole to maintain good writability and enhance tracks per inch (TPI) capability for both conventional and shingle magnetic recording applications.

BACKGROUND

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop. The trailing loop generally has a trailing shield structure with first and second trailing shield sides at the ABS. The second (PP3) trailing shield arches over the write coils and connects to a top surface of the main pole layer above a back gap magnetic connection. The first trailing shield may have a 19-24 kG magnetic layer called a hot seed layer that adjoins a top surface of the write gap. A good hot seed response is required to reduce stray fields in the side shields and leading shield. The leading shield has a side at the ABS and in a non-double write shield (non-DWS) design in not connected to a return path through the back gap connection to the main pole. Optionally, in a DWS scheme, the leading shield connects to a return path and to the back gap connection to form a leading loop for magnetic flux to return to the main pole. A PMR head which combines the features of a single pole writer and a double layered medium (magnetic disk) has a great advantage over LMR in providing higher write field, better read back signal, and potentially much higher areal density.

For both conventional (CMR) and shingle magnetic recording (SMR), continuous improvement in storage area density is required for a PMR writer. A write head that can deliver or pack higher bits per inch (BPI) and higher tracks per inch (TPI) is essential to the area density improvement. In a typical fully wrapped around shield design for a PMR write head, the main pole and hot seed in the first trailing shield are usually comprised of a 19-24 kG magnetic material while the leading shield, side shields are made of 10-16 kG magnetic materials, and the remainder of the trailing shield structure including PP3 trailing shield is made of 16-19 kG magnetic material. If writability can be sustained, a thinner write gap at the main pole trailing (top) surface and a narrower side gap adjoining the main pole sides in the cross-track direction are preferred for better track field gradient (Hy_grad, BPI) and cross-track field gradient (Hy_grad_x, TPI), respectively. To enhance writability, side shield height reduction is important not only to reduce main pole flux shunting to the side shields, but also to allow more main pole volume closer to the ABS. However, side shield saturation may degrade Hy_grad_x and TPI capability, and is a concern with advanced side shield structures made of 10-16 kG magnetic material with a height of <0.15 microns in a side shield region adjacent to the main pole.

Therefore, an improved all wrap around shield design is needed wherein side shield saturation threshold is improved to maintain good writability with side shield heights of ≤0.15 microns along a side adjacent to the main pole while improving TPI capability to at least 400K/in$^2$ for CMR and at least 500K/in$^2$ for SMR.

SUMMARY

One objective of the present disclosure is to provide an all wrap around (AWA) shield design for a PMR writer that maintains writability even with side shield height ≤0.15 micron adjacent to the write pole while enabling better TPI.

Another objective of the present disclosure is to provide a method of making the AWA design of the first objective with conventional materials and processes.

These objectives are achieved by configuring a shield structure for a PMR writer wherein a hot seed layer made of a 19-24 kG magnetic material is formed between a side gap and each side shield made of a 10-16 kG magnetic material, and between the leading gap and a leading shield made of a 10-16 kG magnetic material. The composite side shields and leading shield described herein are especially beneficial for PMR writers with a side gap in the range of 20-60 nm, and where side shield height is <0.15 micron in a portion of the side shield that is adjacent to the main pole.

In preferred embodiments, the top surfaces of the leading shield and leading shield hot seed layer are tapered with respect to a direction orthogonal to the ABS and toward a back end of the PMR writer. Thus, a back side of the leading shield hot seed layer is formed a greater distance from a first plane that bisects the main pole layer in a lengthwise direction and formed parallel to the substrate than a front side of the leading shield hot seed layer at the ABS. According to one embodiment, the leading shield hot seed layer has a first height equal to or less than that of the leading shield. In another embodiment, there may be a second portion of leading shield hot seed layer that extends from a back side of the first portion at a first height distance to a back end that is up to 1 micron from the ABS. The second portion is aligned parallel to the first plane.

In preferred embodiments, leading and trailing sides of the write pole proximate to the ABS are tapered. As a result, the write gap is tapered with respect to the first plane and a back side thereof is a greater down-track distance from the first plane than the front side of the write gap at the ABS. Moreover, the hot seed layer in the first trailing shield may be comprised of two portions with a first portion having a front side at the ABS and a back side at a fourth height, and a greater distance from the first plane than the front side. The second portion of hot seed layer adjoins a back side of the first portion at the fourth height and is aligned parallel to the first plane. A second magnetic layer in the first trailing shield layer has a back side formed at the same height from the ABS as a back side of the second portion of first trailing shield hot seed layer. Optionally, the first portion of trailing shield hot seed layer may have a front section at the ABS and a main pole facing side that is separated a first distance (d1) from the tapered main pole trailing side, and a back section with a back side at the fourth height that is a second distance (d2) from the tapered main pole trailing side where d2>d1.

From a top-down view, each side shield hot seed layer has a first side facing the write pole, and a second side that faces a flared side of the main pole. The first side has a first taper angle with respect to a second plane which bisects the write pole tip and main pole layer while the second side has a second taper angle greater than the first taper angle with respect to the second plane. Thus, a far end of the second side may be a full side shield height up to 0.5 micron from the ABS while a back end of the first side may be substantially parallel to the ABS and formed <0.15 micron from the ABS. In other embodiments, first and second sides may form a continuous curved shape from the ABS to a side of the side shield.

A method for forming the shield structure with hot seed layers in the side shields and leading shield is provided. An opening is formed between two side shields that exposes a portion of the leading shield top (trailing) surface. Thereafter, a conformal hot seed layer is deposited on the sidewalls and bottom surface of the opening. When the hot seed layer is laid down by ion beam deposition (IBD), a photoresist patterning and etching sequence may be followed to remove unwanted regions of hot seed layer to form the first height. The gap layer is then deposited on the hot seed layer. Next, the main pole layer is plated and a chemical mechanical polish process is performed to form a planar top surface of the main pole, side gap, and the side shields including the hot seed layer. Then, the write gap, trailing shield hot seed layer that is made of a 19-24 kG magnetic material, and trailing shield magnetic layer that is made of a 16-19 kG magnetic material are sequentially formed by conventional processing.

BRIEF DESCRIPTION OF THE DRAWINGS

FIG. 3b is an enlarged ABS view of the shield structure surrounding the main pole in FIG. 3a.

FIG. 6b is a top-down view of a POR side shield design (R1) used in the modeling study while

FIGS. 8a-17a are ABS views and FIGS. 8b, and 17b-17c are cross-sectional views showing a sequence of steps where an AWA shield structure is formed around a main pole layer according to an embodiment of the present disclosure.

DETAILED DESCRIPTION

Figure 1A:
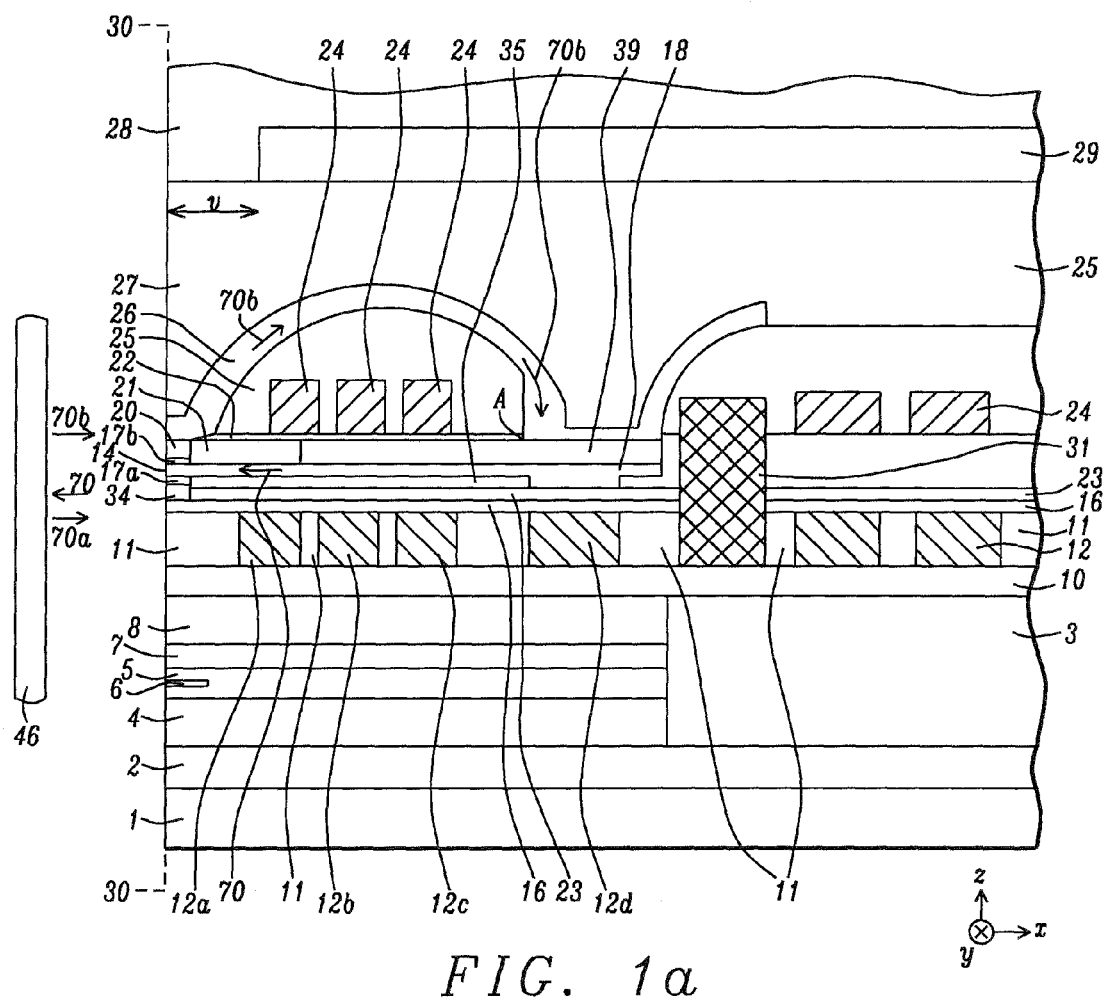
FIG. 1a is a down-track cross-sectional view showing a PMR writer having a non-DWS structure with one flux return pathway (trailing loop)

The present disclosure takes advantage of a composite magnetic structure in the leading shield, side shields, and trailing shield of a PMR writer wherein a high saturation magnetization hot seed layer that is made of a 19-24 kG magnetic material has a main pole facing side adjoining a gap layer, and an opposite side that adjoins a magnetic layer made of a 10-16 kG magnetic material in the leading shield and side shields, and a trailing shield that is made of a 16-19 kG magnetic material in order to improve Hy_grad_x and TPI capability for side shield heights of ≤0.15 micron adjacent to the main pole. Although the exemplary embodiments depict a main pole with a tapered leading side and tapered trailing side, the present disclosure also anticipates embodiments wherein one or both of the main pole leading side and trailing side are not tapered. In the drawings, the y-axis is a cross-track direction, the z-axis is a down-track direction, and the x-axis is in a direction orthogonal to the ABS and towards a back end of the device.

Figure 1B:
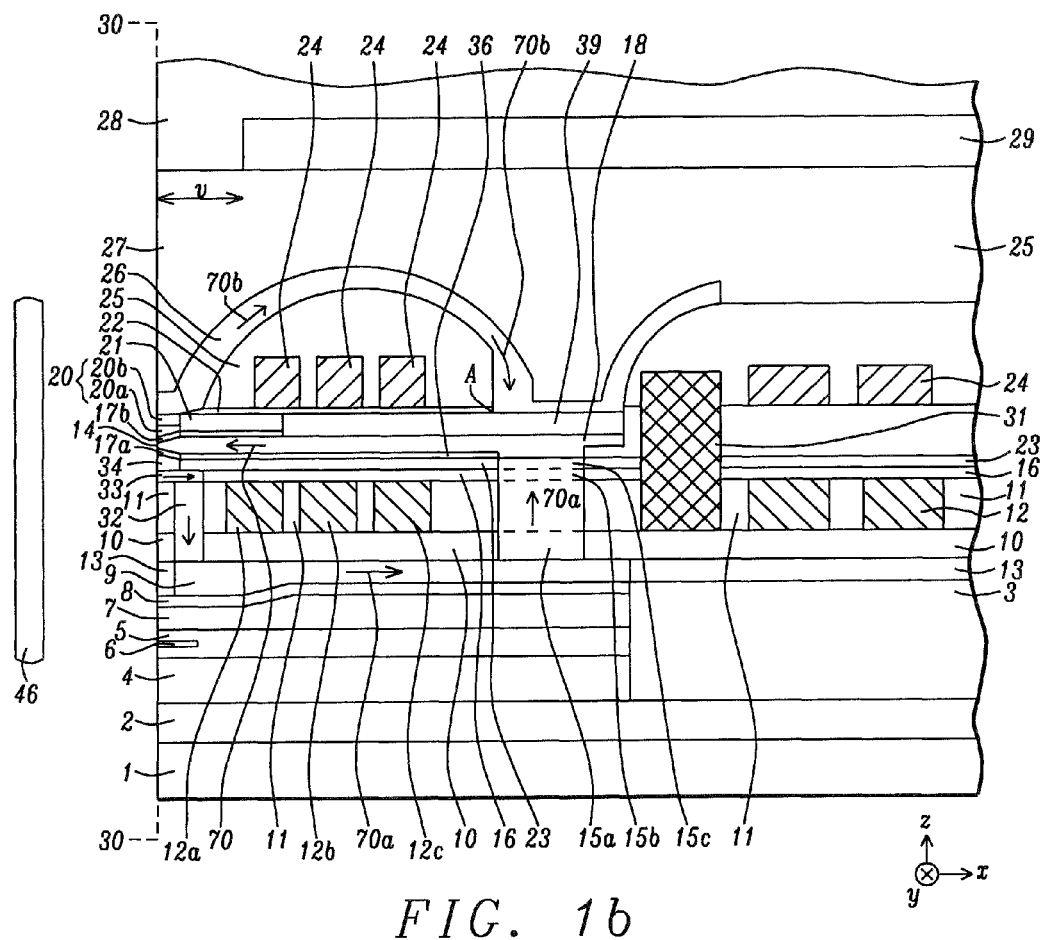
FIG. 1b is a similar view where a PMR writer has a DWS structure with two flux return pathways to the main pole according to process of record (POR) designs.

In both FIG. 1a and FIG. 1b, a PMR writer with a combined read head/write head structure currently fabricated by the inventors according to a process of record (POR) is depicted in a cross-sectional view from a plane that is orthogonal to an air bearing surface (ABS) 30-30. The combined read head/write head is formed on a substrate 1 that may be comprised of AlTiC (alumina+TiC). The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices. Those skilled in the art will recognize that layers 2-8 represent the read head portion which is the same in both FIG. 1a and FIG. 1b.

The present disclosure anticipates that one or more dynamic fly height (DFH) heater elements (not shown) may be formed in one or more insulation layers in the PMR writer structure to control the extent of thermal expansion (protrusion) along the ABS toward a magnetic medium 46 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and top shield layer 7. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

Top shield layer 7 and insulation layer 8 are formed sequentially on read gap 5. Top shield layer 7 has a stack represented by S2A/insulation layer/S2B, and the S2A, S2B layers may be made of the same magnetic material as in the S1 shield 4. Insulation layer 8 may be the same dielectric material as in insulation layer 2.

FIG. 1a (non-DWS scheme) differs from FIG. 1b (DWS design) in the write head portion of the recording device that includes layers 9-35 in the DWS design.

In particular, leading shield connector (LSC) 33, S2C shield 32, return path 9, and a back gap connection (BGC) are omitted so there is no leading loop in FIG. 1a. According to one embodiment, LSC 33 and BGC section 15b in FIG. 1b are replaced by insulation layer 16 in FIG. 1a, and RTP 9 is replaced by insulation layer 13 in FIG. 1a. Upper portions of BGC section 15a and S2C 32 are replaced by insulation layer 11, and lower portions of BGC section 15a and S2C 32 may be replaced by insulation layer 10 in FIG. 1a. Optionally, the upper portion of BGC section 15a is replaced by a dummy coil layer 12d in the exemplary embodiment.

In FIG. 1b, return path (RTP) 9 is recessed from the ABS but is able to transmit flux from magnetic medium 46 to main pole 18 through the leading loop return pathway that includes leading shield 34, leading shield connector (LSC) 33, S2C shield 32, the RTP, and BGC comprised of magnetic sections 15a-15c.

The BGC may be depicted with three sections formed in a laminated manner and represented by stack 15a/15b/15c wherein a bottommost (lower) section 15a contacts a top surface of RTP 9, and an uppermost section 15c with top surface 15s contacts a back portion of the bottom surface of main pole 18. In the exemplary embodiment, there is a first insulation layer 10 formed on the RTP and having an ABS facing side adjoining a bottom portion of the S2C 32 back side, and a back side abutting an ABS facing side of BGC lower section 15a. A second insulation layer 11 is formed on the first insulation layer and extends orthogonal to the ABS from an upper portion of the S2C back side to an ABS facing side of BGC section 15b. In some embodiments, a bucking coil layer 12 with three turns 12a-12c is formed within the second insulation layer and between the S2C back side and BCG section 15a. However, the present disclosure also anticipates that a bucking coil layer with one turn, two turns, or four turns in a 1+1T, 2+2T, or 4+4T configuration may be employed as appreciated by those skilled in the art. Bucking coils are wound in series with an opposite polarity to that in the driving coils 24 to minimize direct coupling between the first trailing shield 20 and driving coils. A top surface of the bucking coil layer is preferably coplanar with a top surface of the second insulation layer, a top surface of BGC section 15a, and a top surface of S2C shield 32.

A front section of second insulation layer 11 may also be formed between the ABS 30-30 and an upper portion of the ABS facing side of S2C shield 32. Likewise, a front section of first insulation layer 10 may be formed between the ABS and a bottom portion of the ABS facing side of the S2C shield. RTP 9 is formed within insulation layer 13 and is recessed a certain distance from the ABS. Insulation layers 10, 11, 13 are comprised of a dielectric material and the bucking coil layer 12 is typically a conductive material such as Cu. In the process of record (POR) practiced by the inventors, leading shield 34, LSC 33, S2C shield, back gap connection layers 15a-15c, and RTP 9 may be made of CoFeN, NiFe, CoFe, or CoFeNi with a saturation magnetization value from 10 kG to 16 kG.

A third insulation layer 16 contacts the top surface of the bucking coil turns 12a-12c and the second insulation layer 11 between a back side of LSC 33 and an ABS facing side of BGC section 15b. There is a fourth insulation layer 23 formed on the third insulation layer and on a back end portion of the LSC. The fourth insulation layer extends from a back side of the leading shield 34 to an ABS facing side of uppermost BGC section 15c. According to one embodiment, first and second insulation layers have a combined thickness in a down-track direction substantially the same as the BGC section 15a thickness, while third and fourth insulation layers have a thickness essentially the same as BGC sections 15b, 15c, respectively. Thus, top surface 23t of the fourth insulation layer is essentially coplanar with BGC top surface 15s. In some embodiments, a bottom yoke (not shown) is provided between lead gap 17a and a back portion of the main pole that adjoins top surface 15s. A bottom yoke may be included in the write head structure to provide a faster writer response compared with designs where only a top yoke is employed. In the exemplary embodiment, insulation layer 36 contacts top surface 23t and has a thickness essentially equal to that of the lead gap.

Above insulation layer 36 is the main pole 18 that may be comprised of CoFe, NiFe, CoFeNi or another 19-24 kG magnetic material. Main pole 18 has a front portion called a write pole with a write pole tip 14 at the ABS 30-30. The main pole extends toward the back end of the device where a back portion is magnetically connected to the back gap connection consisting of sections 15a-15c. The leading shield is separated from the main pole by the lead gap 17a. Flux 70 from the main pole enters a magnetic medium 46 and returns in part as flux 70a though the leading loop comprised of LS 34, LSC 33, S2C shield 32, RTP 9, and BGC 15.

In FIG. 1a-1b, a first write shield layer 20 has a bottom surface formed on write gap 17b at the ABS and extends a throat height distance away from the ABS 30-30 to an ABS facing (front) side of non-magnetic layer 21. The first write shield layer 20 also known as the first trailing shield may be made of CoFeN, CoFeNi, NiFe, or CoFe, for example, and may have a top surface that is coplanar with the top surface of non-magnetic layer 21. The first write shield may be a composite that includes a magnetic (hot seed) layer 20a with a saturation magnetization value from 19-24 kG that contacts a top (trailing) surface of the write gap, and a magnetic layer 20b made of a 16-19 kG magnetic material that adjoins a bottom (leading) surface of an overlying second trailing shield also known as PP3 trailing shield 26. The trailing shield structure serves as a flux return pathway 70b wherein flux from a magnetic medium enters the first write shield and passes through the PP3 trailing shield to a back portion of main pole 18. The first trailing shield layer 20b and PP3 trailing shield are typically made of 16-19 kG magnetic materials.

There is a top yoke 39 adjoining a back side of the non-magnetic layer 21 and contacting a top surface of the main pole 18. The top yoke and bottom yoke (when present) transmit magnetic flux to the main pole where the flux 70 is concentrated at the write pole tip 14. The top yoke extends to a back side at point A where the top yoke touches the inner corner of PP3 26 above a back portion of the main pole. An insulation layer 22 is formed on a portion of the non-magnetic layer 21 and top yoke. Passing a current through the driving coil layer 24 that is disposed on the insulation layer 22 generates magnetic flux in the top yoke 39 and in the main pole. The driving coil layer 24 may have one or a plurality of turns, but three turns are depicted above the main pole in this embodiment. Bucking coils are connected to driving coils through connector 31 that is a greater distance from the ABS than BGC 15a-15c.

First trailing shield 20 is separated from write pole tip 14 at the ABS by write gap 17b that is made of an insulation material. Trailing shield layer 26 referred to as the PP3 shield is formed on first trailing shield 20 along the ABS and on a portion of insulation layer 22 that is above non-magnetic layer 21. In the exemplary embodiment, the PP3 trailing shield has a dome shape and arches over the first three driving coils in layer 24 to connect with the top surface of the top yoke above the BGC 15a-15c. In an alternative embodiment, the PP3 trailing shield may have a planar top surface that is parallel to a top surface of the main pole. An insulation layer 25 is formed on the insulation layer 22 and fills the openings between the turns of driving coil layer 24 and the space between a top surface of the driving coils and a bottom surface of the PP3 shield layer 26. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is formed as the uppermost layer in the write head.

The PMR writer in FIG. 1b has two pathways for magnetic flux to return to the write head from a magnetic medium 46. For example, magnetic flux 70 from main pole 18 exits through write pole tip 14 into a magnetic medium and may return via leading loop 70a as described previously. Flux from the magnetic medium also returns to the write head via trailing loop pathway 70b by entering first write shield 20 at the ABS and then passing through PP3 trailing shield 26 before reaching the main pole. The dual flux return pathway in the POR design in FIG. 1b is employed to reduce skip track erasure (STE). In an alternative embodiment, one or more of BCG layers 15a-15c may be made of a non-magnetic material to force a greater magnetic flux intensity through the trailing loop and less through the leading loop to further activate the first trailing shield layer 20a thereby leading to greater areal density capability (ADC).

In FIG. 1a where only the trailing return loop is present, all of the magnetic components except leading shield 34 but including LSC 33, S2C 32, RTP 9, and BGC 15a-15c in the leading loop of FIG. 1b are replaced with non-magnetic materials such as an insulation layer to simplify the write head structure and thereby require fewer process steps to fabricate.

Figure 2:
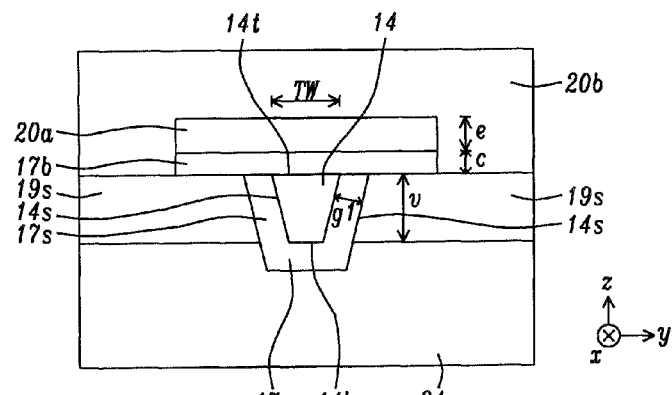
FIG. 2 is an ABS view of the PMR writer in FIG. 1 that shows a 10-16 kG side shield layer adjoining a gap layer on each side of a main pole.

Referring to FIG. 2, an ABS view of the PMR writer in FIG. 1a and FIG. 1b is depicted. Leading shield 34, side shields 19s and trailing shield 20b form an all wrap around (AWA) design wherein shields 19s, 34 are made of a 10-16 kG magnetic material, trailing shield 20b is a 16-19 kG magnetic material, and trailing shield hot seed layer 20a is typically a 19-24 kG magnetic material. The leading shield adjoins a bottom surface of lead gap 17a, and side shields adjoin a side of the side gap that is a side gap distance g1 from the write pole tip 14. Side shields have a thickness v in a down-track direction. Write gap 17b has a thickness c, and a greater cross-track width than track width TW of the write pole tip trailing edge 14t. The write pole has side edges 14s at the ABS that connect trailing edge with leading edge 14b. The write gap contacts write pole trailing edge 14t in addition to top surfaces of side gaps 17s and side shields 19s. Trailing shield hot seed layer 20a may have a cross-track width that is essentially equivalent to that of the write gap, and a thickness e.

The PMR writers in FIG. 1a-1b currently fabricated by the inventors require optimization to be acceptable for advanced technologies. In particular, a thinner write gap thickness c, and narrower side gap dimension g1 are the preferred directions for better on track field gradient (BPI) and cross-track field gradient (TPI), respectively. Furthermore, to enhance write-ability, side shield height reduction is important not only to reduce main pole flux shunting to side shields, but also to allow more main pole volume closer to the ABS. Note that height reduction refers to the distance the side shields 19s extend from the ABS in an x-axis direction. In the POR designs in FIG. 1a-1b, height reduction below 0.15 micron for side shield portions adjacent to the write pole is likely to cause side shield saturation and degradation in cross-track gradient. For advanced PMR writer designs, it is desirable to have write-ability from side shield height reduction and more main pole volume closer to the ABS while maintaining a good cross-track field gradient (TPI capability).

Figure 3A:
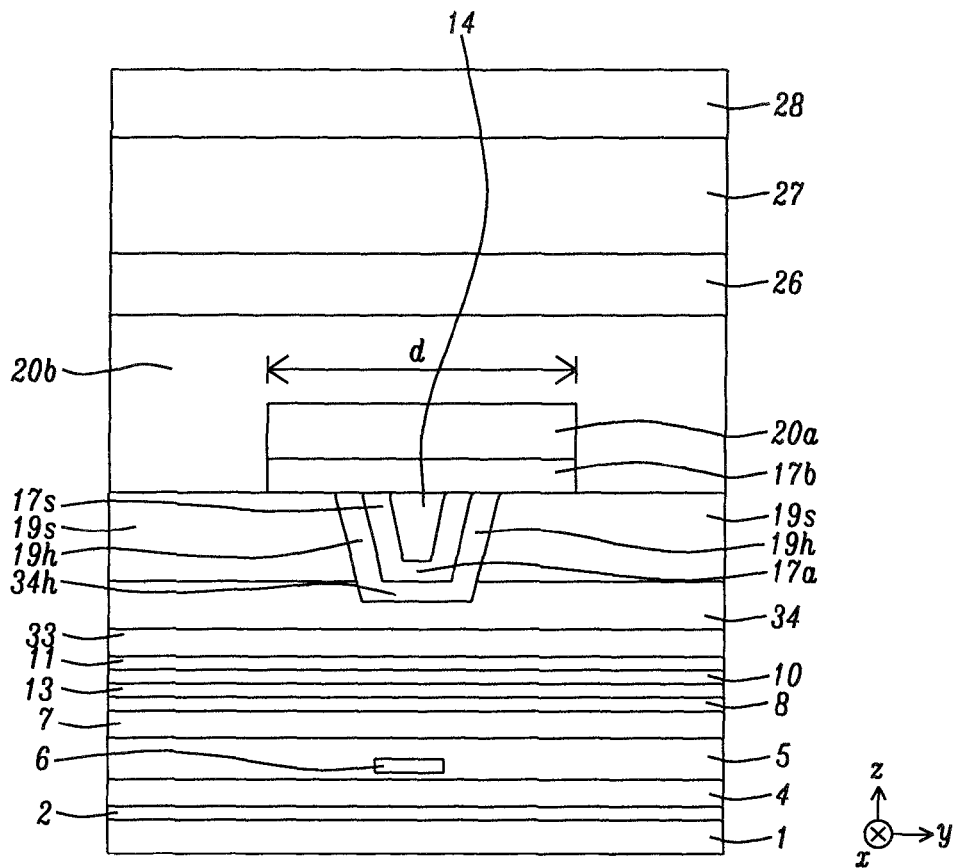
FIG. 3a is an ABS view of the PMR writer according to an embodiment of the present disclosure wherein the PMR writer in FIG. 2 is modified to include a hot seed layer adjoining the lead gap and side gap layers.

We have discovered the aforementioned objectives are achieved with a PMR writer with an AWA shield structure according to FIG. 3a wherein the side shields each have a high saturation magnetization (hot seed) layer made of 19-24 kG magnetic material formed at an interface with the side gap, and a second magnetic layer made of 10-16 kG magnetic material adjoining a side of the hot seed layer that is opposite the side gap. Furthermore, the leading shield preferably has an uppermost hot seed layer that interfaces with the lead gap and connects with the side shield hot seed layers, and a lower magnetic layer made of 10-16 kG material that adjoins the second magnetic layers in the side shields. As a result, when side gap dimensions are reduced to a 20-60 nm range, and side shield height is decreased to 0.15 micron or less, side shield saturation may be prevented while write-ability is maintained or enhanced. In the write head portion according to a DWS scheme, the RTP (not shown) is formed on insulation layer 8 and is recessed behind the ABS and within insulation layer 13. LSC 33, and leading shield 34 are sequentially formed on insulation layer 11.

Figure 3B:
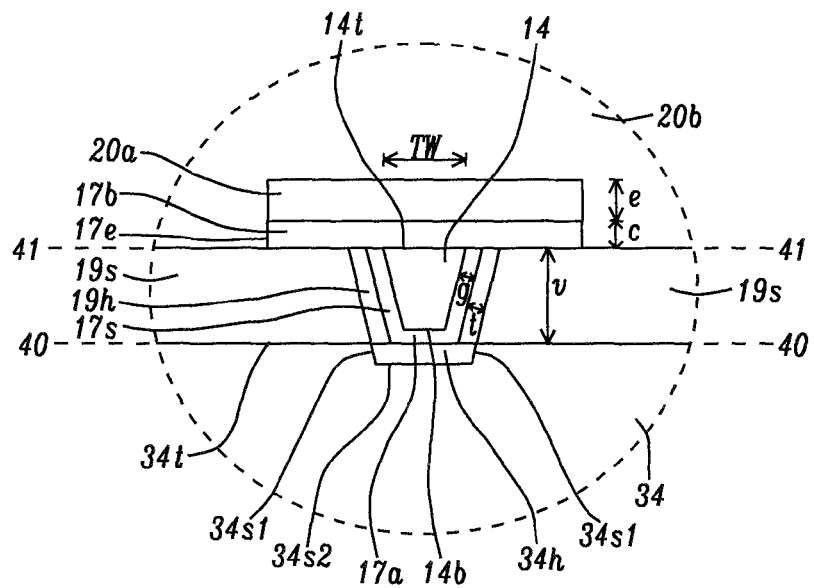

Referring to FIG. 3b, an enlarged ABS view of a PMR writer in FIG. 3a according to a first embodiment of the present disclosure is illustrated. The PMR writer structure from FIG. 2 is retained except for the side shields and leading shield that are configured to include a hot seed layer that interfaces with side gaps and leading gap, respectively. There is a hot seed layer 34h with sides 34s1 and a bottom surface 34s2 that adjoins the leading shield 34. A top surface of hot seed layer 34h is along plane 40-40 that includes a bottom surface of lead gap 17a and a top surface 34t of the leading shield. Hot seed layer 34h is aligned below the write pole tip 14. Thus, the leading shield is considered to be a composite with a lower layer 34 made of a 10-16 kG magnetic material, and an upper hot seed layer 34h made of a 19-24 kG magnetic material wherein the latter has a substantially smaller cross-track width than the former.

Adjoining both ends of hot seed layer 34h along plane 40-40 is a side shield hot seed layer 19h that is preferably comprised of the same material and with the same thickness t as in the leading shield hot seed layer. Hot seed layer 19h has a down-track thickness v from plane 40-40 to a second plane 41-41 where the second plane includes a bottom surface of write gap 17b. Each side shield hot seed layer has a side that adjoins a side gap 17s, and has a side facing away from the write pole tip that adjoins a side shield layer 19s. Therefore, each side shield is a composite with an "inner" hot seed layer 19h, and an "outer" shield layer 19s made of a 10-16 kG magnetic material. Preferably, thickness t is 10 to 100 nm, and more preferably, is from 10 to 50 nm.

The first trailing shield structure comprised of hot seed layer 20a and a second magnetic layer 20b is retained from FIG. 2. In this embodiment, hot seed layer 20a and write gap 17b have a cross-track width d that is greater than a cross-track width of the leading shield hot seed layer 34h, and greater than the track width TW of the write pole tip 14. A side of hot seed layer 20a that faces the main pole also contacts the trailing side of the write gap. Thus, second magnetic layer 20b, outer shield layers 19s, and lower leading shield layer 34 form an AWA configuration around the main pole at the ABS. Side gap 17s has a cross-track width g that is preferably about 20 to 60 nm. The write pole tip has a leading edge 14b and a trailing edge 14t. A portion of the second magnetic layer 20b in the first trailing shield contacts the top surfaces of side shields 19s that are adjacent to the side surface 17e of write gap 17b and along plane 41-41.

Figure 4A:
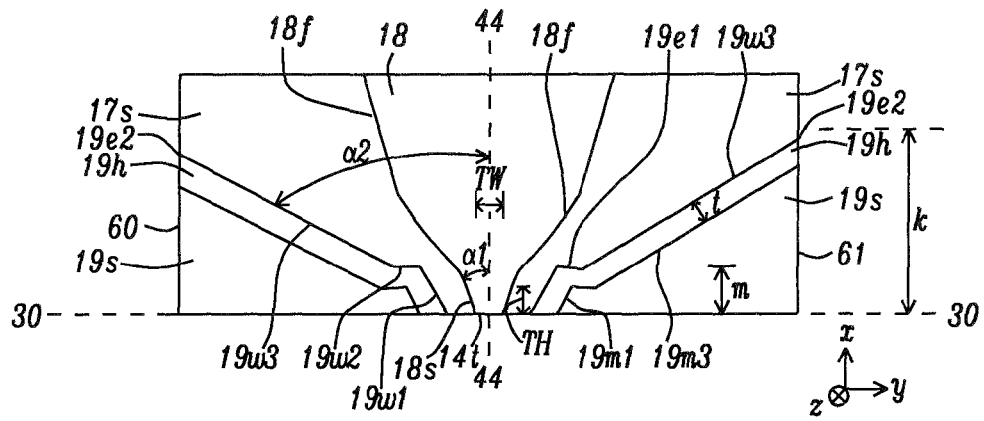
FIGS. 4a, 5a are top-down views of the PMR writer in FIG. 3b where the top shield is removed to show the main pole and adjacent side shields having a double taper (dtSS) design according to embodiments of the present disclosure.

Referring to FIG. 4a, a top-down view of the side shield structure from FIG. 3b is shown with the write gap and trailing shields removed. The write pole 18p extends a throat height (TH) from trailing edge (write pole tip) 14t at the ABS 30-30. Write pole sides 18s have an attack angle α1 between 0 and 30 degrees with respect to center plane 44-44 and connect with flared sides 18f on the main pole 18 at the throat height. The center plane bisects the main pole and is aligned orthogonal to the ABS in an x-axis direction. According to one embodiment, each side shield is double tapered in a so-called "dtSS" design and has a first side 19w1 of hot seed layer 19h that faces write pole side 18s and extends from the ABS to a height m at end 19e1. The first side 19w1 preferably forms angle α1 with respect to the center plane. In some embodiments, there is a short second side 19w2 of hot seed layer 19h that is formed substantially parallel to the ABS and connects end 19e1 to a third side 19w3 that faces flared side 18h and forms an angle α2 with respect to the center plane where α2>α1. Third side 19w3 terminates at end 19e2 that is a full side shield height k from the ABS where k>m, and k may be as large as 1 micron but is preferably ≤0.5 micron, and m is preferably ≤0.15 micron. The second magnetic layer 19s in each side shield is formed between the ABS and hot seed layer 19h, and has sides 19m1, 19m3 facing the main pole and formed substantially parallel to sides 19w1, 19w3, respectively. Both side shield layers 19h, 19s contact sides 60, 61 on opposite sides of the main pole.

Figure 5A:
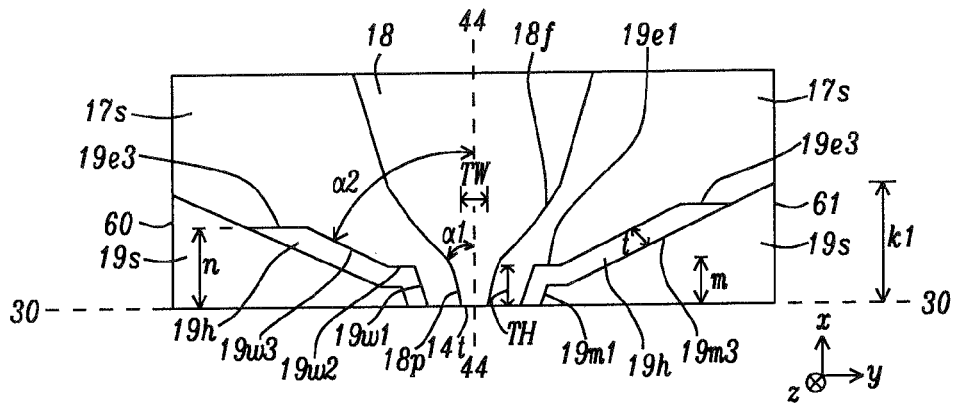

In FIG. 5a, an alternative dtSS design is depicted wherein each hot seed layer 19h is terminated at height n that is equal to or larger than m but less than full side shield height k1 of side shield 19s. In other words, side 19w3 is reduced in cross-track width compared with FIG. 4a, and terminates at end 19e3 rather than end 19e2 while side shield 19s contacts sides 60, 61. End 19e3 may be formed substantially parallel to the ABS 30-30 and does not contact either side 60 or 61 of the side shield structure.

Figure 4B:
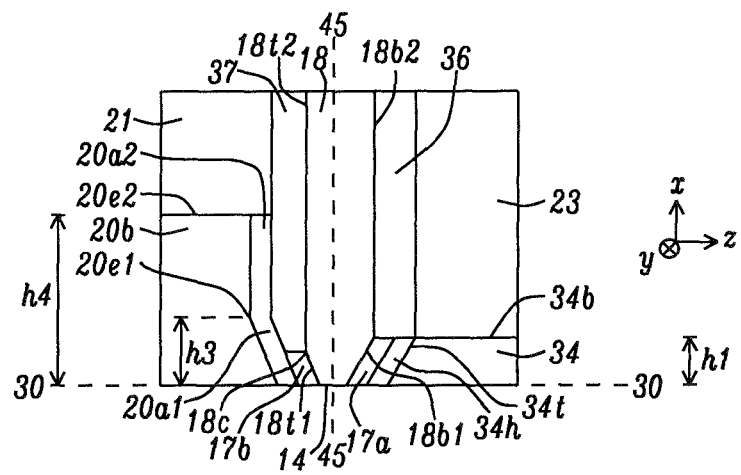
FIGS. 4b, 5b are down-track cross-sectional views of the PMR writer in FIG. 3b with a leading shield, trailing shield, and main pole having tapered leading and trailing sides according to embodiments of the present disclosure are illustrated.

In FIG. 4b, a down-track cross-sectional view along plane 44-44 that applies to either FIG. 4a or FIG. 5a side shield embodiments is shown and depicts an embodiment where the main pole has a tapered leading side 18b1 that extends from the ABS 30-30 to a first height h1. There is a second leading side 18b2 of the main pole that is aligned parallel to a second plane 45-45 which is orthogonal to the ABS and to plane 44-44. The second leading side extends from an end of the tapered leading side toward a back end of the PMR writer. Moreover, the main pole has a tapered trailing side 18t1 with a front end at the ABS and a back end at corner 18c that may be less than the first height from the ABS. A second trailing side 18t2 of the main pole has a front end adjoining the back end of tapered trailing side 18t1 and is aligned parallel to the second plane.

Leading shield 34 has a tapered trailing side 34t that faces the main pole 18 and is aligned substantially parallel to main pole tapered side 18b1, and has a back side 34b at the first height h1 that adjoins an ABS facing side of insulation layer 23. Insulation layer 36 is formed between insulation layer 23 and main pole leading side 18b2. Leading shield hot seed layer 34h adjoins the leading side 34t of the leading shield, has a side facing the main pole that is formed substantially parallel to main pole side 18b1, and has a back side that contacts insulation layer 36 at the first height. In other embodiments, the back side of the leading shield hot seed layer has a height less than h1. Leading gap 17a preferably has a uniform thickness in a down-track direction, contacts both of hot seed layer 34h and main pole leading side 18b1, and adjoins a front side of insulation layer 36 at the first height.

Write gap 17b preferably has a uniform thickness in a down-track direction, is formed between a tapered section 20a1 of the first trailing shield hot seed layer and main pole trailing side 18t1, and has a back side that adjoins a front side of insulation layer 37 at corner 18c. Tapered section 20a1 has a front side at the ABS 30-30, a back side 20e1 at a third height h3, and a main pole facing side that contacts the trailing side of the write gap and is substantially parallel to main pole trailing side 18t1. A second section 20a2 of the first trailing shield hot seed layer adjoins the back side of tapered section 20a1 at the third height h3, has a back side that adjoins an ABS facing side of non-magnetic layer 21, has a main pole facing side that contacts insulation layer 37, and has a lengthwise dimension along the x-axis that is parallel to plane 45-45. Third height h3 may be greater than, equal to, or less than h1. In one aspect, the back side of second section 20a2 is formed at the same height h4 as the back side 20e2 of the second magnetic layer 20b and adjoins the ABS facing side of non-magnetic layer 21. The second magnetic layer has a front side at the ABS and a back side that contacts the ABS facing side of non-magnetic layer 21.

Figure 5B:
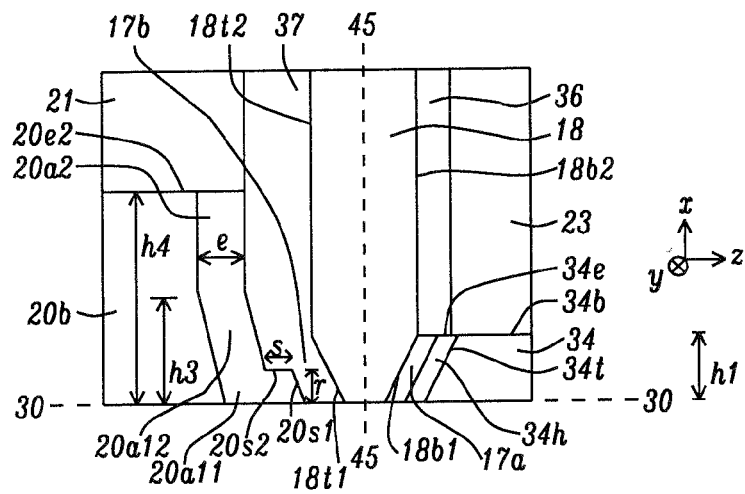

In an alternative leading shield design depicted in FIG. 5b which may be used with either of the side shield structures in FIG. 4a and FIG. 5a, leading shield hot seed layer 34h may have an end 34e that is less than or equal to height h1. Furthermore, first section of the first trailing hot seed layer may be modified to have first and second portions 20a11 and 20a12, respectively, where portion 20a12 is offset an additional cross-track distance s from the main pole trailing side 18t1 compared with first portion 20a11. First portion 20a11 has a side at the ABS 30-30, a side 20s1 that is substantially parallel to main pole trailing side 18t1 and which extends a distance r orthogonal to the ABS and has a cross-track width (s+e). Second portion 20a12 has an ABS side that adjoins the first portion 20a11, a uniform cross-track width e, and a back side that contacts an ABS facing side of section 20a2 at the third height h3. Second portion 20a12 is moved farther from the main pole than first portion 20a11 in order to reduce the magnetic coupling between the first trailing shield and main pole 18 proximate to the ABS.

Figure 4C:
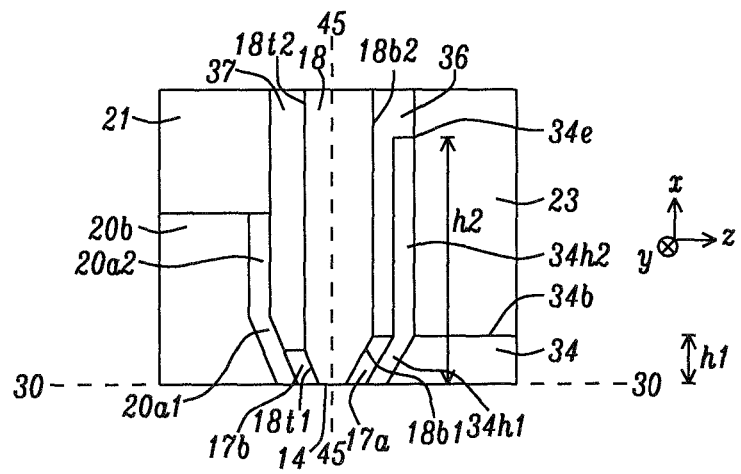
FIGS. 4c, 5c are down-track cross-sectional views of the PMR writer in FIGS. 4b, 5b, respectively, wherein the leading shield hot seed layer is further comprised of a second section according to embodiments of the present disclosure.
Figure 5C:
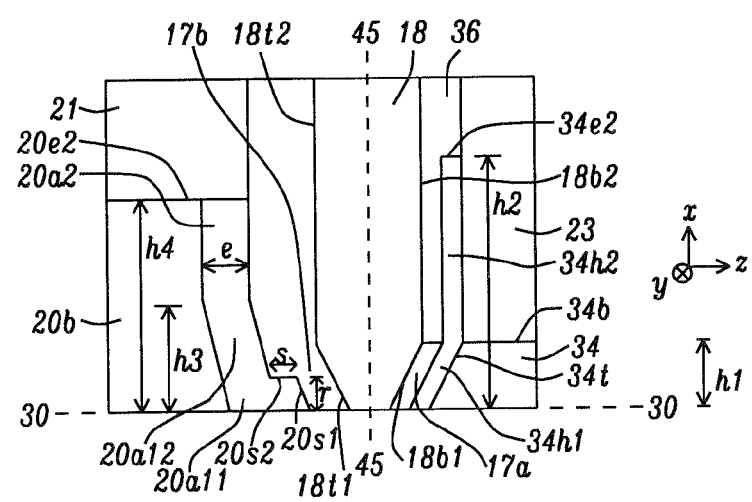

Referring to FIG. 4c and FIG. 5c, another embodiment of the present disclosure is depicted where all features are retained from FIG. 4b and FIG. 5b, respectively, except the leading shield hot seed layer is comprised of two sections. A first section 34h1 corresponds to hot seed layer 34h in the previous embodiment. Second section 34h2 also referred to as the "tail" adjoins the back side of the first section 34h1 at the first height h1 and is aligned parallel to plane 45-45 with a back end 34e2 at a second height h2 that may be as far as 1 micron from the ABS. Thus, the lengthwise dimension of the tail along the x-axis direction may be expressed as h2-h1. The volume of insulation layer 36 is reduced compared with the previous embodiment, but separates the second section 34h2 from main pole leading side 18b2.

Figure 6A:
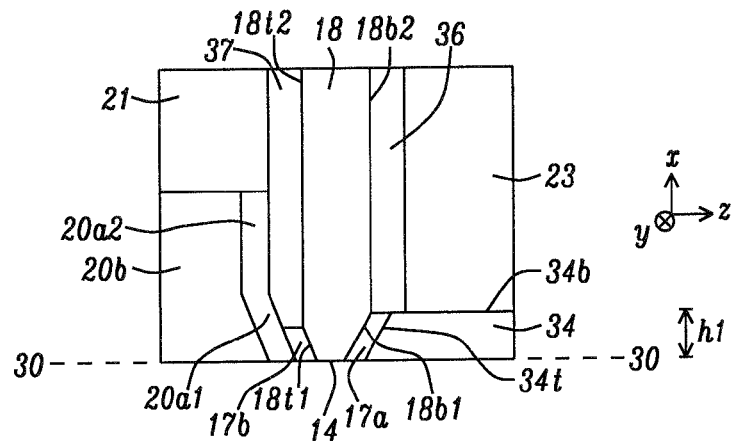
FIG. 6a, 7a are down-track cross-sectional views of a PMR writer having a leading shield and trailing shield formed with a process of record (POR) design practiced by the inventors.
Figure 7A:
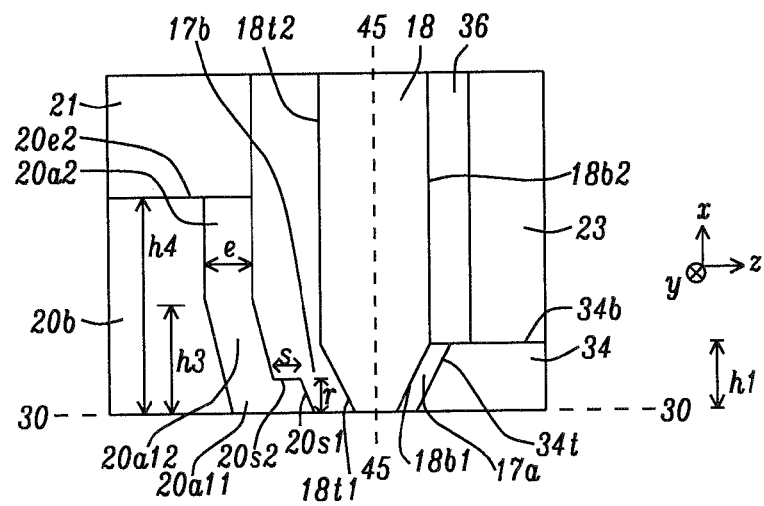

FIG. 6a and FIG. 7a each illustrate a down-track cross-sectional view of a PMR writer with a double tapered side shield (dtSS) design previously fabricated by the inventors. There are no hot seed layers in the leading shield or side shields. The first trailing shield which may be comprised of hot seed layer sections 20a1, 20a2, and magnetic layer 20b were described previously in the embodiment shown in FIG. 4b, or alternatively, in the embodiment shown in FIG. 5b. In both FIG. 6a and FIG. 7a, leading shield has a tapered trailing side 34t that adjoins the leading gap 17a. Main pole 18 may have tapered leading side 18b1, second leading side 18b2, tapered trailing side 18t1, and second trailing side 18t2 as described previously. Leading shield has a back side 34b that is a first height from the ABS. The features of leading gap 17a and write gap 17b were described earlier.

Figure 6B:
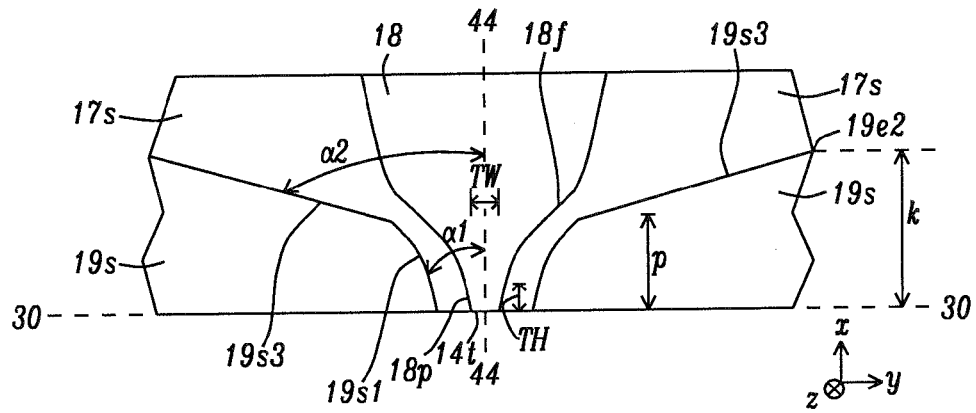

FIG. 6b shows a top-down view of the POR side shield design defined as R1 in the modeling study described in a later section. The side shield is comprised only of layer 19s made of a 10-16 kG material, and is bulky since first side 19s1 is formed substantially parallel to write pole side 18s, and second side 19s3 is substantially parallel to main pole side 18f until reaching a height p from the ABS 30-30. First side 19s1 that is proximate to the ABS has a taper angle α1 substantially the same as write pole side 18s. A second side 19s3 is connected to side 19s1 at height p and thereby the two sides form essentially a continuous curved surface from the ABS to end 19e2. Second side 19s3 at height p forms an angle α2 with respect to center plane 44-44.

Figure 7B:
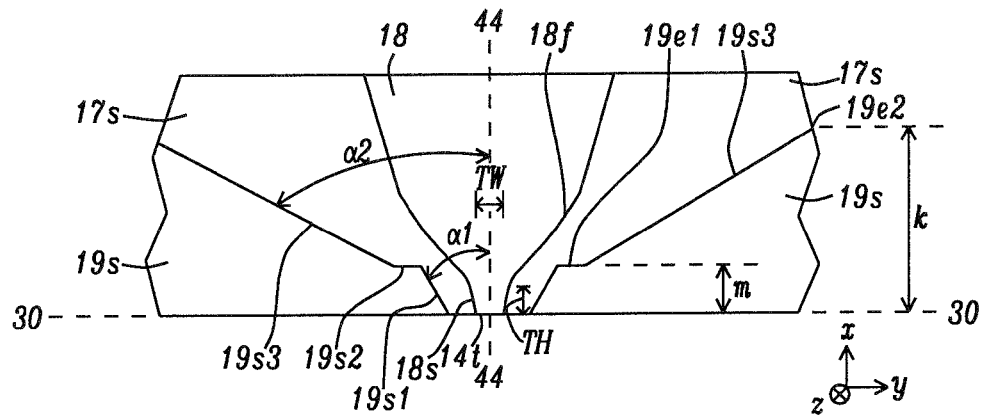
FIG. 7b is a top-down view of a POR side shield design (R2) used in the modeling study.

FIG. 7b depicts another embodiment of a POR side shield design defined as R2 in the subsequent modeling study, and shows a top-down view of the PMR writer in either FIG. 6a or FIG. 7a. Again, side shields are comprised only of layer 19s. First side 19s1 forms a taper angle α1 substantially parallel to write pole side 18s and has an end 19e1 at height m that is preferably less than 0.15 micron from the ABS. A second side 19s2 may be substantially parallel to the ABS 30-30 and connects with an end of the first side, and with an end of a third side 19s3 where the third side is tapered with angle α2 and has an end 19e2 at height k. Angle α2>angle α1. The third side faces a flared side 18f of the main pole 18.

The present disclosure also encompasses a method of forming a PMR writer having a hot seed layer adjacent to the side gap and leading gap in the side shields and leading shield, respectively, as depicted in FIG. 8a-15c. We have previously disclosed a method of making a PMR writer in related U.S. Pat. No. 8,749,919. The process described herein differs from the previously disclosed method only in the formation of the hot seed layer in the side shields and leading shield. Thus, the process sequence begins with formation of the 10-16 kG magnetic layers on the leading shield.

Figure 8A:
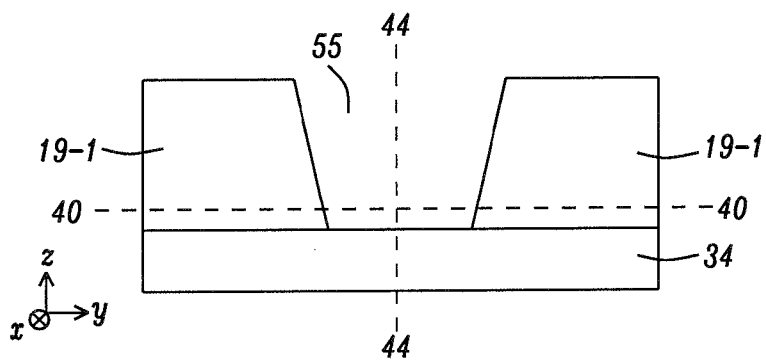

From a cross-sectional perspective at the eventual ABS in FIG. 8a, leading shield layer 34 comprised of 10-16 kG magnetic material is provided as a substrate. Magnetic shield layers 19-1 are plated by a conventional method to form an opening 55 in which the hot seed layers 19h, 34h, side gap and lead gap layers, and main pole layer will be formed in subsequent steps. Note that the portion of magnetic layer 19-1 below plane 40-40 will become part of the leading shield 34 and the portion above plane 40-40 will become the side shield layer 19s as indicated in subsequent steps.

Figure 8B:
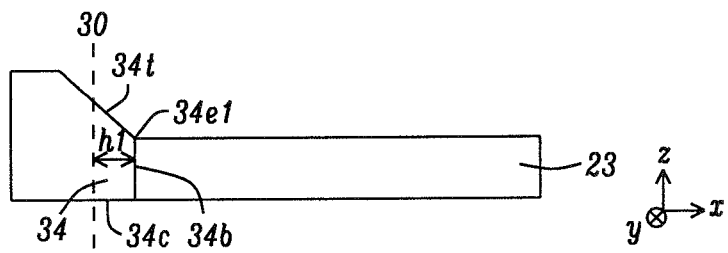

FIG. 8b is a down-track cross-sectional view along plane 44-44 in FIG. 8a and shows the eventual ABS (plane 30-30) that is determined after a lapping process at the end of the PMR writer fabrication sequence. A photoresist patterning and etching sequence as described in related U.S. Pat. No. 8,749,919 may be used to form a leading shield tapered trailing side 34t that intersects the eventual ABS and terminates at a back end 34e1 at back side 34b which in this embodiment is equal to first height h1 from plane 30-30. The tapered leading side 34t at plane 30-30 is a greater down-track distance than the back end from the leading shield bottom surface 34c. In an alternative embodiment depicted in FIG. 8c, the back side 34b' of the leading shield may be a greater distance from the ABS than the back end 34e1 of tapered leading side from plane 30-30.

Figure 9:
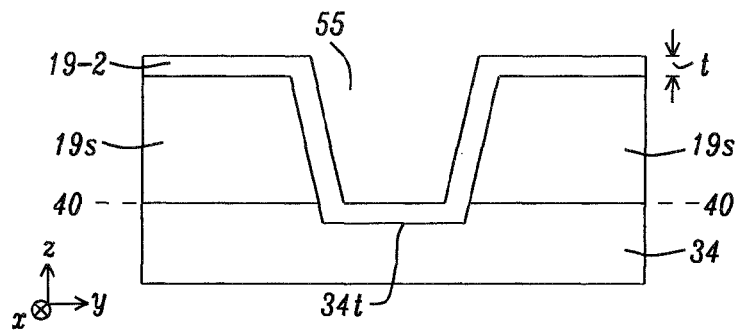

Referring to FIG. 9, hot seed layer 19-2 is deposited by ion beam deposition (IBD) or by a plating technique in opening 55 and preferably forms a conformal film with thickness t on leading shield trailing side 34t and on side shield layers 19s that are made of a 10-16 kG magnetic material. Plating may be employed to form the leading shield hot seed layer configuration shown in FIG. 4b or FIG. 5b. Dry deposition techniques such as IBD may be used to form the leading shield hot seed layer configuration shown in FIG. 4c or FIG. 5c. A photoresist layer (not shown) may be coated and patterned to form an opening that defines the surface onto which the hot seed layer is deposited. Alternatively, when IBD is used to deposit the hot seed layer in the absence of a photoresist mask, an ion milling process coupled with a photoresist mask is required to remove the unwanted regions of the leading shield hot seed layer that are not within or proximate to opening 55.

Figure 10A:
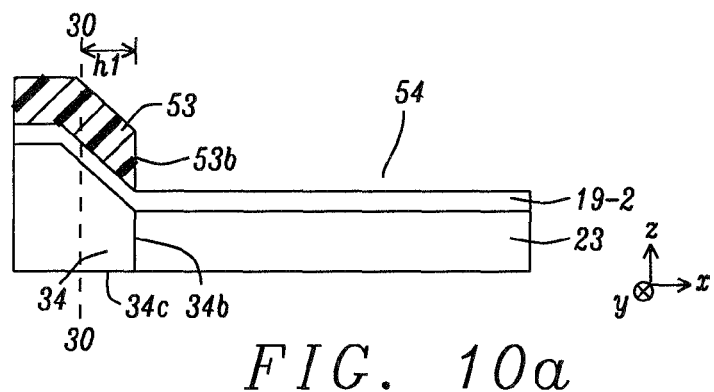

FIG. 10a depicts an embodiment where IBD is employed to deposit the hot seed layer 19-2 on leading shield 34 in FIG. 8b. Then a photoresist 53 is coated and patterned to form a back side 53b which exposes an opening 54 above regions of hot seed layer 19-2 to be removed during a subsequent milling process. A back side 53b of the photoresist overlays on leading shield back side 34b. In another embodiment (not shown), back side 53b may be formed closer to plane 30-30 than the first height distance h1.

Figure 8C:
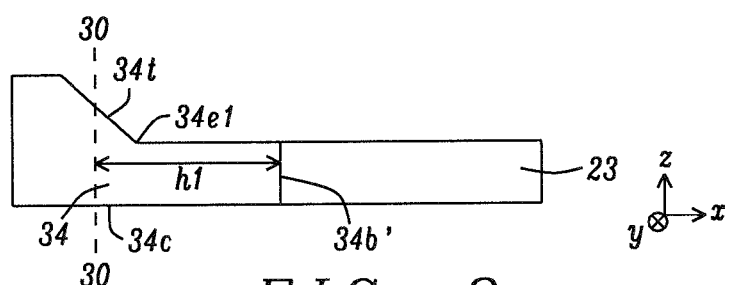
Figure 10B:
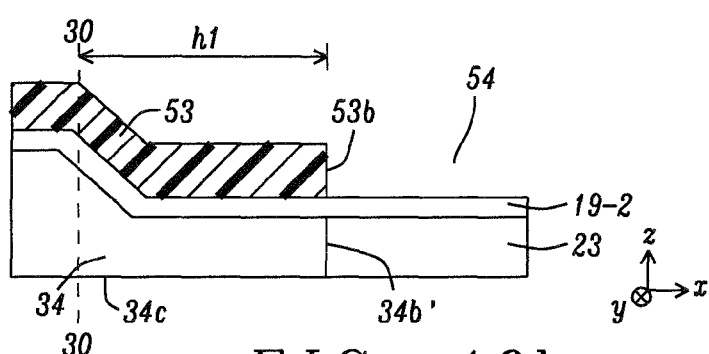

In another embodiment shown in FIG. 10b where hot seed layer 19-2 is deposited on leading shield 34 in FIG. 8c, the photoresist back side 53b may be overlaid on back side 34b' such that the leading shield back side and hot seed layer 19-2 have the same first height following the ion milling process. In another embodiment, back side 53b may be formed closer to plane 30-30 than the first height distance h1.

Figure 11:
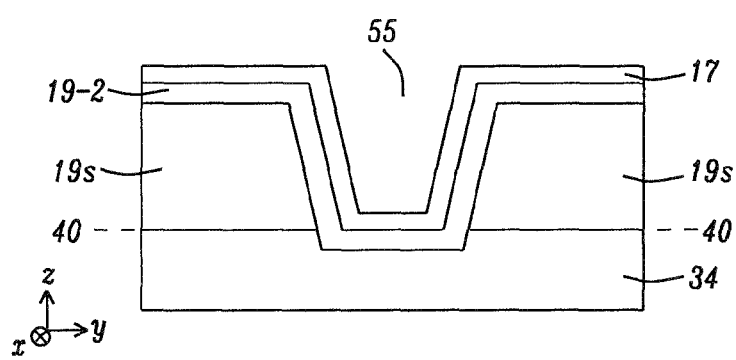

Thereafter in FIG. 11, gap layer 17 is deposited on hot seed layer 19. The gap layer is preferably conformal with a thickness of about 20 to 60 nm and becomes the leading gap and side gap layers after subsequent processing. It should be understood that the gap layer may be a composite such as a lower alumina layer contacting the hot seed layer, and an upper Ru layer disposed on the alumina layer.

Figure 12:
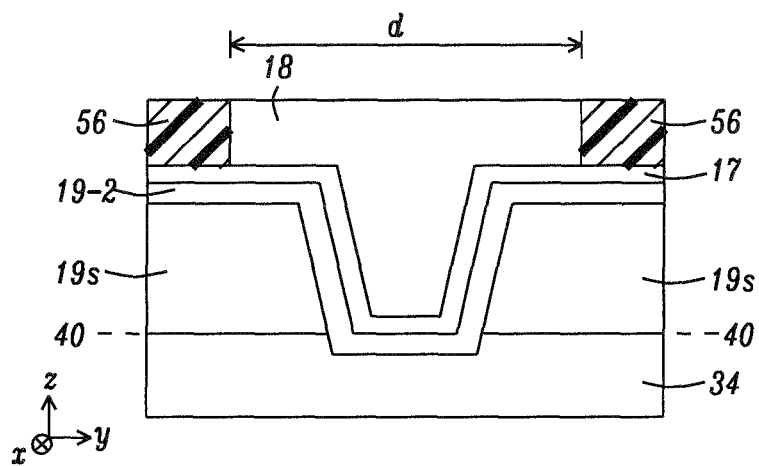

Referring to FIG. 12, a photoresist layer 56 is coated and patterned to form an opening having a cross-track width d that exposes opening 55. Then the main pole layer 18 is plated to fill the photoresist opening and also opening 55.

Figure 13:
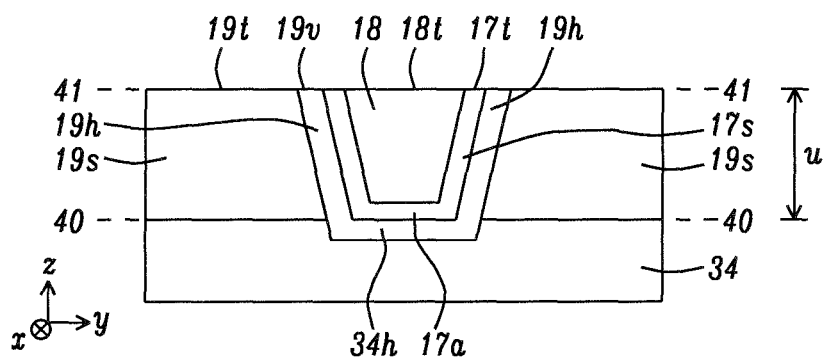

In FIG. 13, a chemical mechanical polish (CMP) process is employed to remove photoresist layer 56 and also top portions of the main pole, gap layer, and hot seed layer such that a top surface 19t of side shield layers 19s becomes coplanar with a top surface 19v of hot seed layers 19h, top surface 17t of side gaps 17s, and with trailing side 18t of the main pole 18 along plane 41-41. Note that side portions of hot seed layer 19 are now shown as hot seed layers 19h in the side shields, and bottom portion is depicted as hot seed layer 34h in the leading shield.

Figure 14:
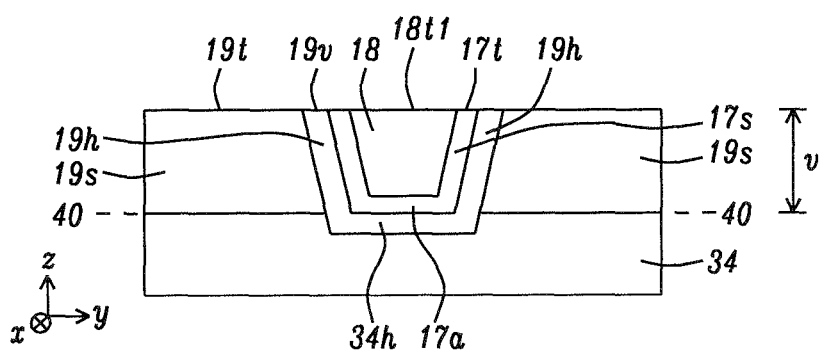

Referring to FIG. 14, a cross-sectional view at the eventual ABS is shown after a photoresist layer (not shown) is coated and patterned to form an opening above a front portion of the main pole proximate to the ABS. Ion milling is used to form the tapered trailing side 18t1. The down-track thickness of side shields 19s may be reduced from u in FIG. 12 to v after ion milling. The photoresist layer used to form the pattern for ion milling is then removed by a conventional method.

Figure 15:
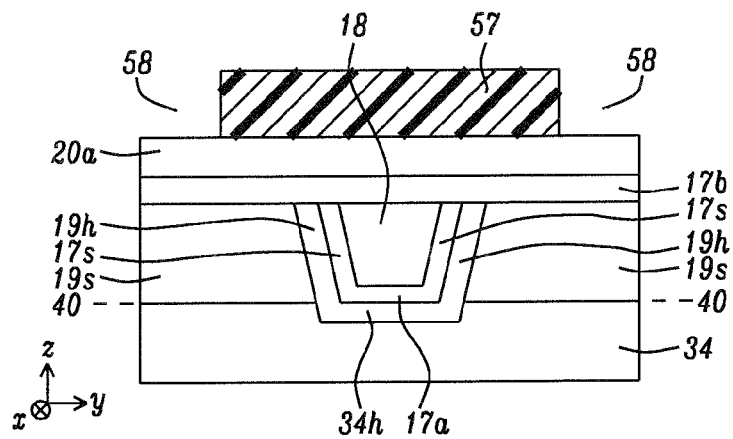

In FIG. 15, the partially formed PMR writer is shown after write gap layer 17b and hot seed layer 20a are sequentially deposited on top surfaces of the side shield layers 19h, 19s, on main pole trailing side 18t1, and on side gaps 17s. A photoresist layer 57 is coated and patterned to form openings 58 that expose top surface portions of the hot seed layer 20a. Photoresist layer will be used as an etch mask during the following step.

Figure 16:
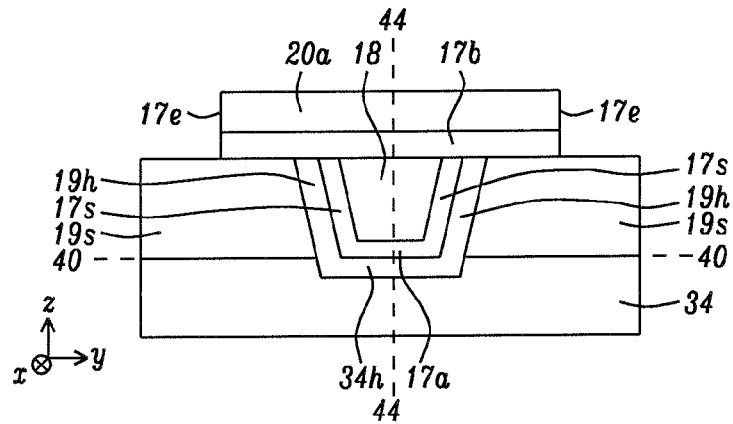

Referring to FIG. 16, openings 58 are etch transferred through exposed portions of write gap layer 17b and first trailing shield hot seed layer 20a and the etch stops on a top surface of side shield layers 19s to generate sidewalls 17e. Next, photoresist layer 57 is removed by a conventional method.

Figure 17A:
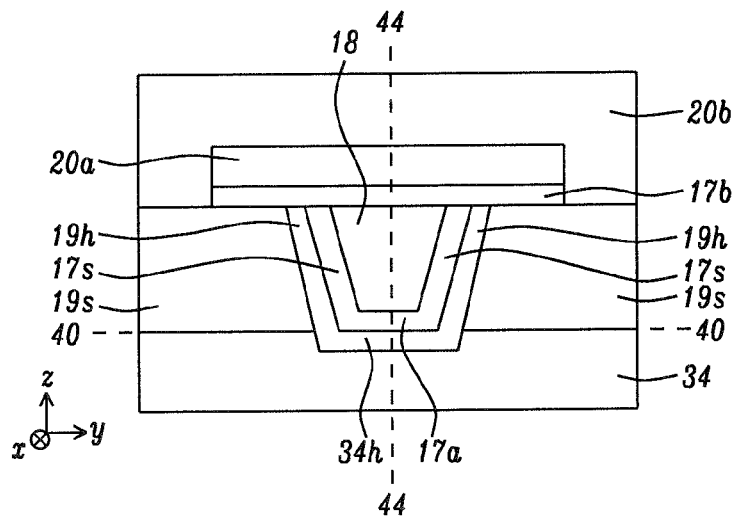

In FIG. 17a, first trailing shield layer 20b is plated by a well known method to complete the first trailing shield structure. As a result, first trailing shield layer 20b contacts sidewalls 17e, top surfaces of side shields 19s that are adjacent to the write gap. Thereafter, conventional steps are followed to complete the write head structure shown in FIG. 1a or FIG. 1b.

Figure 17B:
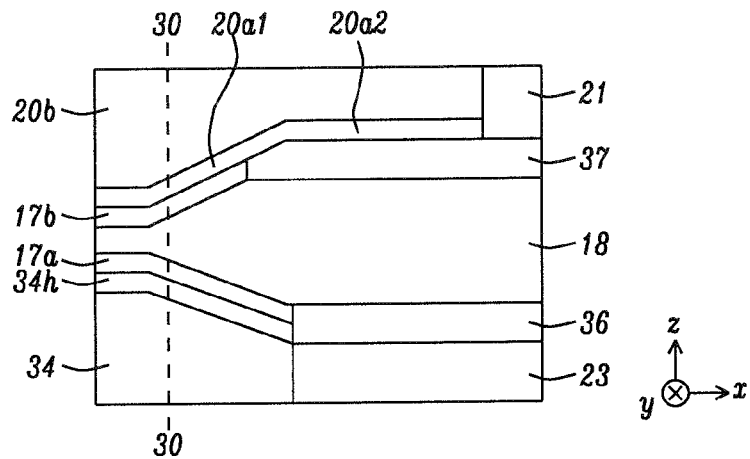

A down-track cross-sectional view is shown in FIG. 17b of the partially completed PMR writer structure in FIG. 17a along plane 44-44. After the PMR writer is completed using conventional processing as mentioned above, a lapping process is employed to form the ABS along plane 30-30.

Figure 17C:
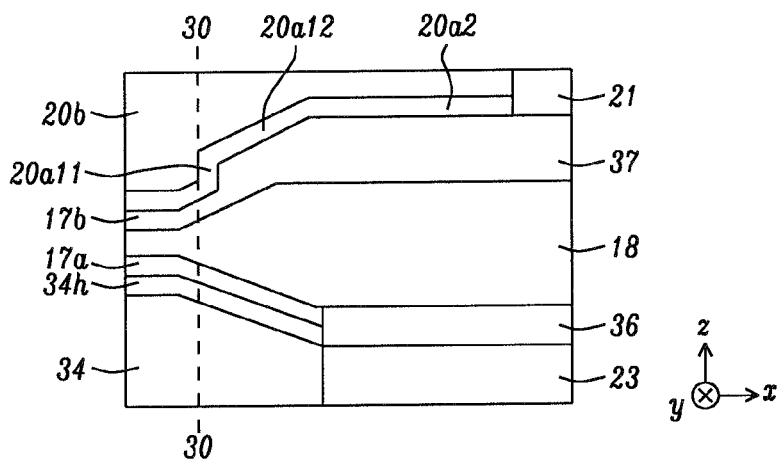

FIG. 17c depicts an alternative embodiment of the down-track cross-sectional view of the PMR writer in FIG. 17a along plane 44-44. It should be understood that additional process steps are required to form the trailing shield sections 20a11, 20a12, and 20a2 that are not included herein.

To demonstrate the effectiveness of the AWA shield design of the present disclosure, a modeling study was performed where the POR side shield structure in FIG. 6b serves as a first reference (R1) and the dtSS shield structure in FIG. 7b is a second reference (R2). R1 has a side gap dimension g1 in FIG. 2 of 45 nm while R2 (also represented by the ABS view in FIG. 2) has a side gap g1 of 40 nm. Side shield height k (FIG. 6b) for R1 and side shield height m (FIG. 7b) for R2 were 0.20 micron and 0.08 micron, respectively, for the modeling study. Six variations of the shield structure shown in FIG. 4a and FIG. 5a where side shield hot seed layer height is m were included in the modeling study and each has a side gap g (FIG. 3b) equal to 40 nm. Thickness t was varied from 10 to 40 nm. Samples C1 and C2 represent an embodiment (FIG. 4b or FIG. 5b) where the leading shield hot seed layer has only one section 34h while samples C3-C6 represent an embodiment (FIG. 4c or FIG. 5c) where the leading shield hot seed layer has a front section 34h1 with height of 0.08 micron and a tail section 34h2 with a height (h2-h1) of 400 nm or 800 nm (0.8 micron).

TABLE 1

Thickness & height dimensions of side shield hot seed layer in modeling study

| Example | Thickness (nm) | Tail Height (nm) |
|---------|----------------|------------------|
| C1 | 10 | 0 |
| C2 | 40 | 0 |
| C3 | 10 | 800 |
| C4 | 10 | 400 |
| C5 | 40 | 400 |
| C6 | 40 | 800 |

Figure 18:
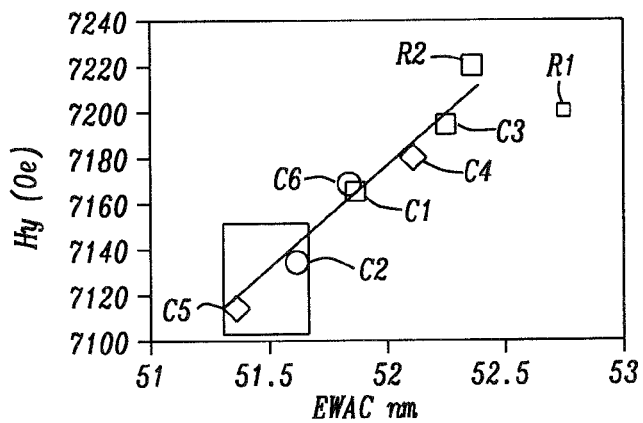
FIG. 18 is a plot comparing Hy vs. EWAC for various PMR writer designs of the present disclosure and two reference structures.
Figure 19:
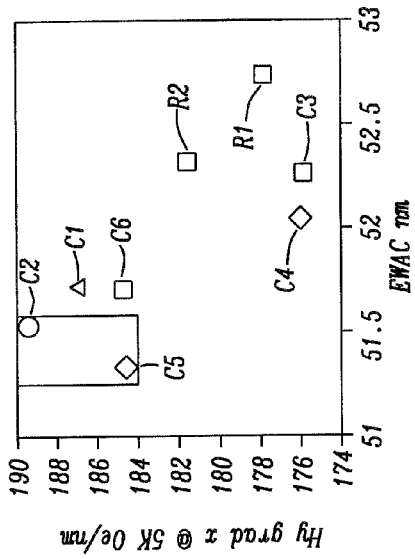
FIG. 19 is a plot comparing Hy grad@5K Oe/nm vs. EWAC for various PMR writer designs of the present disclosure and two reference structures.
Figure 20:
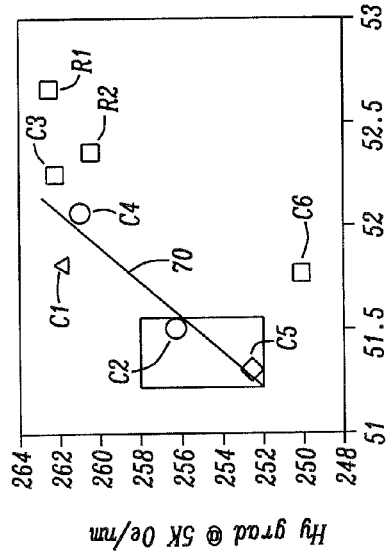
FIG. 20 is a plot comparing Hy grad x@5K Oe/nm vs. EWAC for various PMR writer designs of the present disclosure and two reference structures.

Results from the modeling study are illustrated in FIGS. 18-20. The dtSS design R2, with smaller side shield height and slightly smaller side gap than R1, outperforms R1 in Hy, Hy_grad, and Hy_grad_x after normalization according to erase width during AC mode (EWAC) in FIG. 18, FIG. 19, and FIG. 20, respectively. Compared with R2, examples C1, C2, C5, and C6 have slightly lower write-ability in view of the lower Hy field in the range of 7120-7160 Oe vs 7220 Oe for R2 (FIG. 17), but there is a significant improvement, especially for examples C2 and C5 in terms of Hy_grad (closer to trend line 70 in FIG. 19), and in Hy_grad_x (FIG. 20) over R2.

Figure 21:
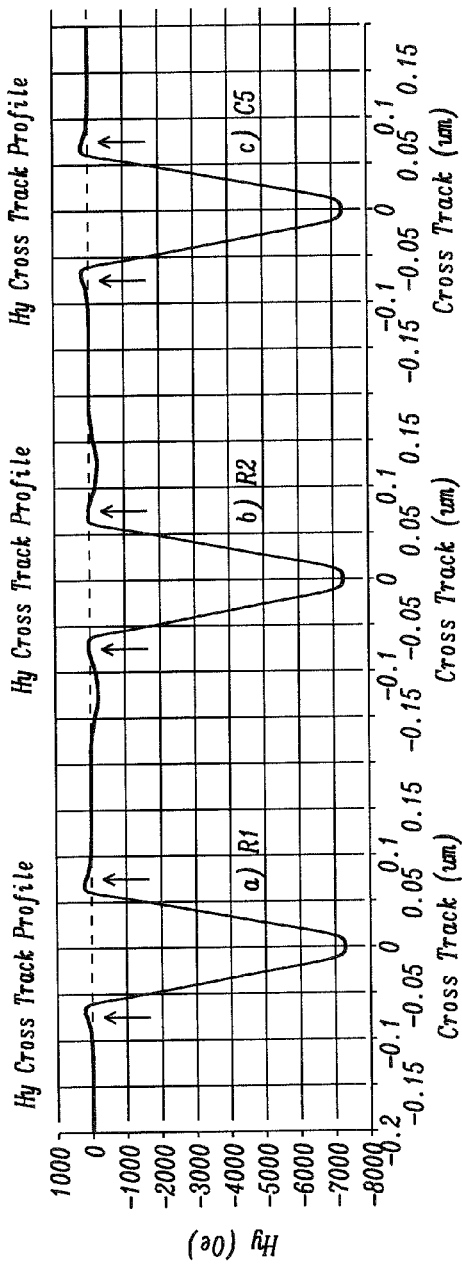
FIG. 21 illustrates cross-track profiles for a PMR writer with an AWA shield design according to an embodiment of the present disclosure, and for two reference structures.

In FIG. 21, Hy cross-track profiles are shown for R1, R2, and example C5. A return field (+Hy value above arrows and dashed line) is observed for R1 which is considered good for Hy_grad_x and TPI capability. However, due to a thinner side shield height and decreased side gap, R2 exhibits essentially no return field. Example C5 has the same side shield height and side gap dimension as R2 but demonstrates that a hot seed layer formed adjacent to the side gap is able to restore the return field to a positive value for better Hy_grad_x and TPI capability.

The present disclosure anticipates that other write head designs may be compatible with the AWA shield design in the exemplary embodiments. However, a key feature common to all embodiments is a composite side shield structure with an "inner" hot seed layer made of a 19-24 kG magnetic material adjoining each side gap, and an "outer" second magnetic layer formed on a side of the hot seed layer that faces away from the main pole. The inner hot seed layer has a higher magnetic flux threshold than the second magnetic layer in the side shields and therefore is able to generate a return field in the cross-track direction. Moreover, the leading shield is preferably a composite with an upper hot seed layer contacting the lead gap and a lower second magnetic layer where the second magnetic layers are a 10-16 kG magnetic material. Improvement in Hy_grad and Hy_grad_x are achieved with incorporation of the hot seed layer in the side shields and leading shield while write-ability is substantially maintained.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer, comprising:
   (a) a main pole with a leading side and a trailing side, and two sides that connect the leading and trailing sides at an air bearing surface (ABS) and proximate to the ABS, the two sides are on each side of a center plane that is orthogonal to the ABS and bisects the main pole;
   (b) a gap layer that surrounds the main pole at the ABS and is comprised of a write gap that contacts the trailing side, a lead gap adjoining the leading side, and a side gap contacting a side of the main pole on each side of the center plane; and
   (c) a shield structure including a side shield on each side of the center plane, a leading shield, and a trailing shield comprising;
      (1) a first hot seed layer made of a 19-24 kilogauss (kG) magnetic material and with a first side facing the main pole layer wherein a first portion thereof in each side shield contacts the side gap, and a second portion thereof in the leading shield contacts the lead gap;
      (2) a second hot seed layer made of a 19-24 kG magnetic material and with a first side facing the trailing side of the main pole and contacting a trailing side of the write gap;
      (3) a first magnetic layer made of a 10-16 kG magnetic material that adjoins a side of the first and second portions of the first hot seed layer that face away from the main pole, the first portion of the first hot seed layer and a first portion of the first magnetic layer form a composite side shield while the second portion of the first hot seed layer and a second portion of the first magnetic layer form a composite leading shield; and
      (4) a second magnetic layer made of a 16-19 kG magnetic material that adjoins a trailing surface and sides of the second hot seed layer thereby forming a composite trailing shield, the first and second magnetic layers form an all wrap around (AWA) shield configuration.

2. The PMR writer of claim 1 wherein the first hot seed layer has a thickness from about 10 to 100 nm.

3. The PMR writer of claim 1 wherein the first portion of the first hot seed layer has a full side shield height, or has a height less than that of the first magnetic layer in the composite side shield.

4. The PMR writer of claim 1 wherein the main pole leading side and trailing side each have a tapered portion with a front end at the ABS, the leading side tapered portion extends a first height (h1) from the ABS, and the trailing side tapered portion extends to a third height from the ABS such that a back end of each tapered portion is a greater distance than the front end from a second plane that is orthogonal to the center plane and the ABS.

5. The PMR writer of claim 4 wherein the second portion of the first hot seed layer has a side facing the tapered portion of the main pole leading side, and extends to a first end that is less than or equal to h1 from the ABS, the portion of the magnetic layer in the leading shield that adjoins the second portion of the first hot seed layer extends to the first height from the ABS.

6. The PMR writer of claim 5 wherein the second portion of the first hot seed layer is further comprised of a section with a side aligned parallel to the second plane and with a front end that adjoins the first end at the first height (h1) and a back end at a second height (h2) from the ABS where h2>h1.

7. The PMR writer of claim 6 wherein h2 is less than about 1 micron.

8. The PMR writer of claim 1 wherein the first portion of the first hot seed layer is double tapered such that a first side thereof facing a write pole portion of the main pole is formed at a first angle α1 with respect to the center plane, and a second side of the first portion that faces a flared side of the main pole is formed at a second angle α2 with respect to the center plane where α2>α1.

9. The PMR writer of claim 8 wherein the first side of the hot seed layer first portion extends from the ABS to a height of ≤0.15 micron, and the second side extends from an end of the first side to a side of the side shield structure that is ≤0.5 micron from the ABS.

10. The PMR writer of claim 1 wherein the write gap has a cross-track width equal to a cross-track width of the second hot seed layer, and greater than a track width of the main pole trailing side.

11. The PMR writer of claim 1 wherein the side gap has a cross-track width of about 20 to 60 nm.

12. The PMR writer of claim 1 wherein the second hot seed layer in the composite trailing shield has a first section that is formed substantially parallel to the main pole tapered trailing side, and extends a third height (h3) from the ABS, the second hot seed layer has a second section formed parallel to the second plane and with a front end adjoining the first section of the second hot seed layer at the third height and extends to a fourth height where h4>h3.

13. The PMR writer of claim 12 wherein the first section of the second hot seed layer has a first portion at the ABS that is separated from the main pole tapered trailing side by a first cross-track distance, and has a second portion which adjoins a back side of the first portion and is separated from the main pole trailing side by a second cross-track distance greater than the first cross-track distance, the second portion has a back side at the third height.

* * * * *